Oct. 20, 1936.  J. CENTOFANTI  2,057,936
ANTISKIDDING DEVICE FOR AUTOMOTIVE VEHICLES AND THE LIKE
Filed April 1, 1935  2 Sheets-Sheet 1
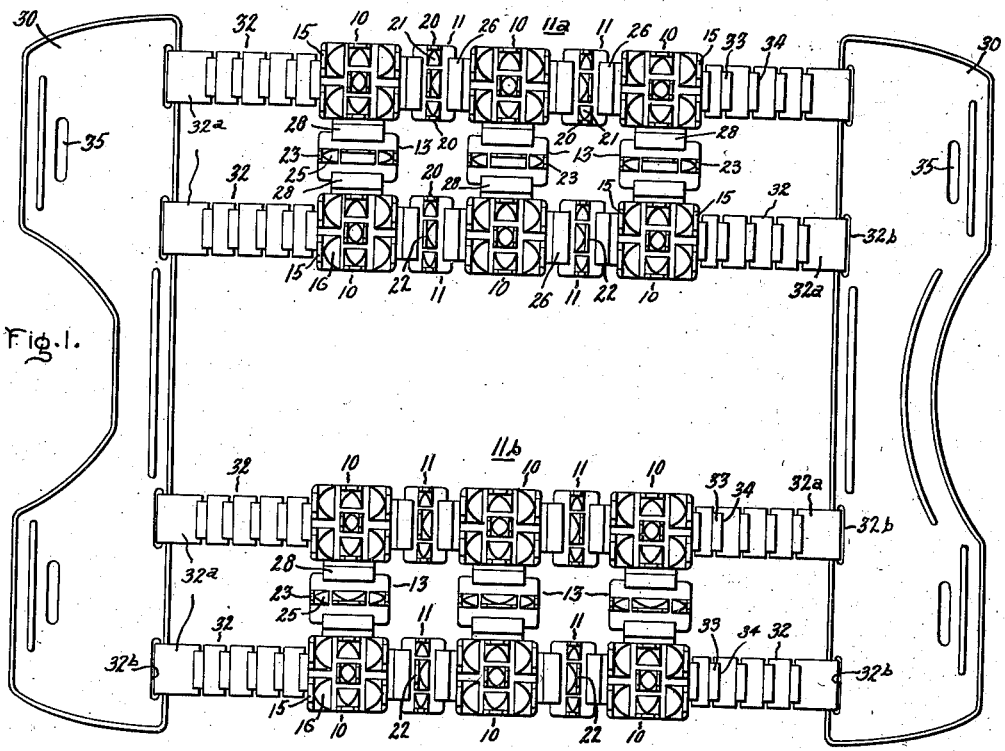
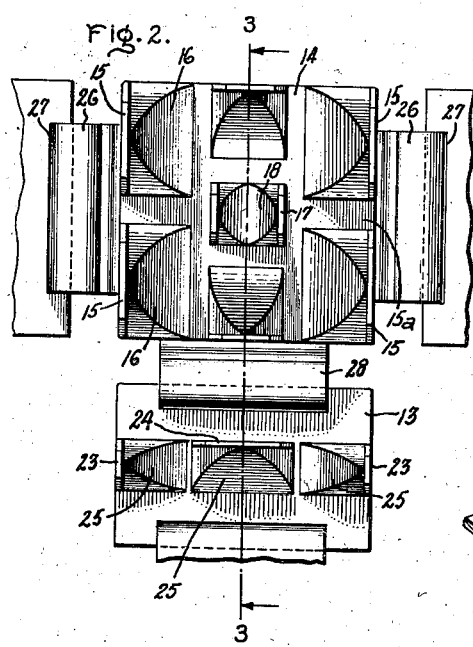
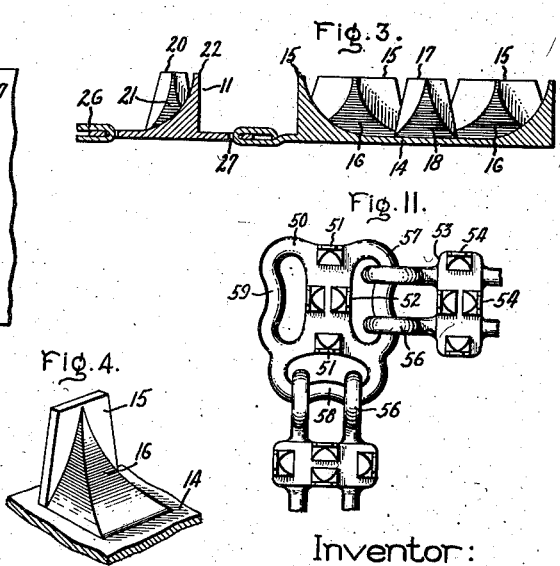
Inventor:
Joseph Centofanti,
by Sheridan L. Biggs
His Attorney.

Oct. 20, 1936.  J. CENTOFANTI  2,057,936
ANTISKIDDING DEVICE FOR AUTOMOTIVE VEHICLES AND THE LIKE
Filed April 1, 1935  2 Sheets-Sheet 2
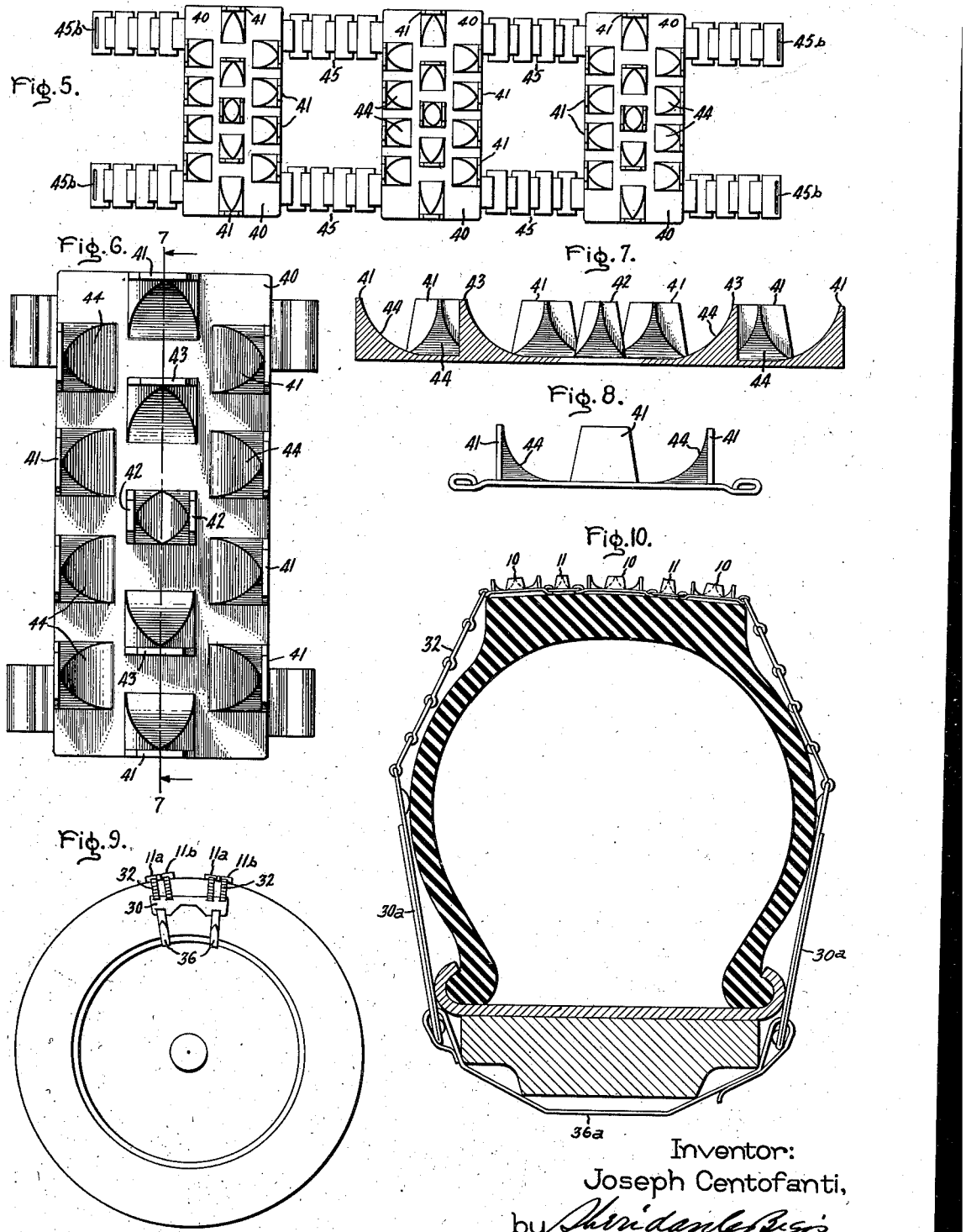
Inventor:
Joseph Centofanti,
by *[signature]*
His Attorney.

Patented Oct. 20, 1936

2,057,936

UNITED STATES PATENT OFFICE 2,057,936

ANTISKIDDING DEVICE FOR AUTOMOTIVE VEHICLES AND THE LIKE

Joseph Centofanti, Schenectady, N. Y.

Application April 1, 1935, Serial No. 14,032

6 Claims. (Cl. 152—14)

This invention relates to anti-skidding devices, more particularly to anti-skidding devices intended to be applied to the tires of automotive and other vehicle wheels to prevent skidding or slipping of the vehicle and to improve its traction, and it has for its object the provision of a device of this character which is efficient in its operation, simple and mechanically strong in its construction and less expensive to make than those heretofore commonly used, and further, one which can be easily and quickly applied to the vehicle wheels.

An important feature of this invention is the provision of an anti-skidding device which when applied to the vehicle wheel will increase the traction of the wheel so as to prevent skidding or slipping in all directions, and which will provide increased traction for the wheel for driving the vehicle both in forward and reverse directions.

In accordance with this invention the anti-skidding device comprises a plurality of tread links or plates arranged to be applied to the traction surface of the wheel. On the traction surface of these plates are a plurality of lugs or projections positioned and arranged so as to prevent skidding of the wheel in any direction on wet or slippery roads, and further to function as "mud hooks" on wet or soft ground. These traction plates are connected together by means of links so as to form a chain, the links also being arranged to assist the traction plates to prevent skidding of the vehicle.

For a more complete understanding of this invention, reference should be had to the accompanying drawings in which Fig. 1 is a plan view of an anti-skidding device arranged in accordance with this invention; Fig. 2 is an enlarged fragmentary view of a portion of the anti-skidding device shown in Fig. 1; Fig. 3 is a sectional view taken through the line 3—3 of Fig. 2 and looking in the direction of the arrows; Fig. 4 is a perspective view of a portion of the anti-skidding device of Figs. 1, 2 and 3; Fig. 5 is a plan view of a modified form of this invention; Fig. 6 is an enlarged plan view of a portion of the anti-skidding device shown in Fig. 5; Fig. 7 is a sectional view taken through the line 7—7 of Fig. 6 and looking in the direction of the arrows; Fig. 8 is a front elevation of a portion of the device shown in Fig. 6; Fig. 9 is a diagrammatic view of an automotive vehicle wheel illustrating the manner in which the anti-skidding device of this invention is applied to the tire and the wheel; Fig. 10 is a sectional view of an automotive vehicle wheel also illustrating one way in which the anti-skidding device of this invention may be applied to the wheel; and Fig. 11 is a fragmentary plan view illustrating still another modified form of this invention.

Referring to Figs. 1-4 inclusive, there is shown one form of this invention which is particularly applicable to trucks and other relatively large and heavy vehicles, but it is to be understood that this form of the invention has general application. As shown, this form of the invention comprises a plurality of traction plates 10 which are connected together by means of links 11. The links connect the plates together so as to form a chain 11a which is arranged to be positioned circumferentially about the traction face of the tire or wheel, if the tire be substantially circular in cross-section, and transversely across the traction surface if it be substantially flat. In this form of the invention, it is preferable to arrange the chain plates in pairs 11a, 11b and to connect the two chains together by means of cross or transverse links 13, and further, it is preferable to use a plurality of these sets of chains; as shown, there are two sets of these chains employed. The plates 10 and the links 11 and 13 preferably will be formed of a mechanically strong and wear-resistant metal, and one which is capable of being worked mechanically as by means of dies, such as steel.

Each traction member 10 comprises a substantially flat plate-like body 14 (Figs. 2, 3 and 4) of substantially rectangular form. On the peripheral edges of the traction surface of each plate are arranged a plurality of upright lugs or projections 15. The lugs may be arranged substantially perpendicular to the plate or they may be inclined slightly to the vertical, and preferably each lug will be somewhat wider at its base than at its top, as clearly shown in Fig. 4. As shown, there are two of the lugs at each side of the plate and one at each end. Those at the side, as shown, are positioned so that relatively small spaces 15a are left between them.

Each of the lugs 15 is reenforced by a relatively large mass of metal 16 extending upwardly from the base 14 substantially to the top of the associated lug. This mass 16, as shown more clearly in Fig. 4, has substantially the shape of a pyramid, the base of which is secured to the plate 14 and one side of which is secured to the associated upright lug 15. It is to be understood that the reenforcing member 16 should be formed integrally with the plate and the associated lug. The side of the pyramid 16 adjacent the lug 15 will, of course, be vertical, or have the inclination of the lug, if the latter be arranged at an angle to the vertical. The remaining three sides of the pyramid preferably will be curved inwardly, as shown in Fig. 4, that is, have a slightly concave form. This provides sharp cutting edges at the junctures of the sides.

The center of each plate 15 is reenforced by means of lugs 17 arranged in parallel to the lugs 15 at the side and opposite the spaces 15a between these lugs. These lugs 17, like the lugs 15, are reenforced by masses of metal 18 similar to the reenforcing masses 16. These centrally arranged lugs function to support the central portion of the plate engaging the road surface, and further, function to assist the outer lugs to prevent skidding of the wheel.

The links 11 between the plates 10 are of rectangular form, preferably having a length substantially the same as the plates 10, and having a width considerably less than the width of the plates 10. Each link 11 is provided with lugs 20 at each end, similar to the lugs 15 and 17, and reenforced by metallic masses 21, similar to the masses 16 and 18, and further, provided with a similarly reenforced lug 22 in the center, arranged substantially perpendicular to the lugs at the ends.

The links 13 between the chains 11a and 11b are in general similar to the links 11, but are positioned substantially at right angles to the links 11, as shown in Figs. 1 and 2. The links 13, as shown, are provided with lugs 23 at the ends and a lug 24 in the central portion intermediate its ends and arranged at right angles to the lugs 23. The lugs 23 and 24 are reenforced by metallic masses 25 similar to the masses 16 and 18.

The plates 10 are mechanically connected with the links 11 by means of straps 26, preferably formed integrally with the plates 14 at their sides and arranged in loops which are received in apertures 27 provided for them in the sides of the links 11, as shown more clearly in Fig. 3. The plates 10 are connected to the cross links 13 by similarly arranged straps 28.

The two chains 11a and 11b of each set of chains are connected to elongated metal clamping plates or straps 30 by means of a series of strap connections 32, which are arranged similar to the strap connections between the plates 10 and the links 11 and 13. That is, each strap link 32 is provided with a loop 33 that is received in a slit or aperture 34 in the adjacent strap. The end links 32a are mechanically connected to the straps 30 by a similar loop arrangement provided on the strap 32a received in slits 32b provided for them in the straps 30.

The straps 30 are provided with slits 35 so as to receive flexible leather or like straps 36 (Fig. 9) whereby the anti-skidding device is secured to the vehicle wheel. In Fig. 10, the straps 30a, corresponding to the straps 30 of Figs. 9 and 10, are somewhat wider than the straps 30, as shown, and are connected together by means of a leather or metallic flexible strap 36a, corresponding to the leather strap 36 of Fig. 9.

In using the anti-skid device shown in Figs. 1-4 inclusive, it will be understood that one or more of the sets of chains 11a and 11b, arranged as shown in Fig. 1, will be applied to the tire, as shown in Figs. 9 or 10. Preferably, three sets of these devices arranged 120° apart along the circumference of the wheel will be used.

It will be understood that the lugs 15 on the plate 10, arranged at right angles to each other, will dig into ice or snow, or engage slippery road surfaces to prevent skidding of the wheel and hence of the associated vehicle in any direction. The centrally arranged lugs 17 assist the lugs 15 to prevent skidding of the wheel, and further, support the central portion of the plate, that is, strengthen and stiffen the plate.

Moreover, it is to be noted, that the sets of lugs 20 and 22 of the links 11, arranged at right angles to each other, assist the lugs 15 and 17 on the plates 10 to prevent skidding; and also, that the cross links 13, provided with similarly arranged lugs, assist further the action of the plates 10 to prevent skidding of the vehicle. In addition, it is to be noted that the links 11 and 13 are positioned at right angles to each other so that the resulting action of their lugs is to prevent skidding in all directions.

It will also be noted that the reenforcing masses 16 and 18 and 21 and 25 of the lugs engage the traction surface of the road, especially if the surface is sufficiently soft to permit the associated lugs to dig into the surface for any material distance. Thus, these reenforcing members materially assist the lugs to prevent skidding, and to provide traction if the vehicle is on a soft ice, snow or mud traction surface.

The plates 10 and the links 11 and 13 may be made in any suitable manner, but preferably will be formed by suitably arranged dies. The plates 10 and the links 11 and 13, as well as their associated straps 26, may be made by relatively simple mechanical operations, which render the entire device relatively cheap to manufacture.

The form of my invention shown in Figs. 5, 6, 7 and 8 is substantially the same in its construction as the form shown in Figs. 1–4 inclusive except that the traction plates are relatively longer than the plates shown in the first form, and the transverse links 13 are eliminated. As shown, this form of the invention comprises elongated metallic plates 40 of rectangular form. Each of these plates is provided with a plurality (four) of lugs at the sides spaced at intervals and a single lug 41 at each end. Arranged in the center of the plate are lugs 42 disposed opposite the spaces between the two inner lugs at the sides and arranged parallel with the lugs at the sides. Between the lugs 42 at the center and the lugs 41 at the ends are lugs 43 arranged perpendicular to the lugs at the sides and center and parallel with the two lugs at the ends. Each of these lugs 41, 42 and 43 have substantially the same construction as the lugs in the first form, and each, like the lugs in the first form, is reenforced by a metallic mass 44 similar to the metallic reenforcing masses of the first form.

The plates 40 are mechanically connected together at spaced intervals by means of a series of chains or links 45 which are similar to the links 32 of the first form, and these plates may be connected to wide straps or plates similar to the plates 30 shown in Fig. 1, or if desired, they may be secured to the tire directly by passing straps through the slits 45b provided in the end links.

In use, these plates function in substantially the same fashion as the anti-skidding device of the first form to prevent skidding or slipping of the car in any direction and to provide traction for assisting the car to move both in the forward and in the reverse directions.

The form of the invention shown in Fig. 11 is adapted particularly to the lighter type of passenger vehicle. As shown, this form comprises a plate 50 which corresponds to the plates 10 of the first form of the invention, shown in Fig. 1. This plate is provided with a pair of lugs 51 positioned opposite each other at the ends, and a pair of lugs 52 positioned opposite each other at the sides substantially midway between the end lugs. These lugs 51 and 52 have the same form as the lugs of the previously described forms of this invention. The plate 50 is connected to a similar plate (not shown) by means of a link 53 corresponding to the links 11 of Fig. 1. This link 53 is provided with four lugs 54, similar to lugs 51 and 52 and arranged on the link in the same manner as are the lugs 51 and 52 on plate 50. The plate 50 is also connected to a similar plate (not shown) by a link 55 similar to link 53.

The links 53 and 55 are provided with loops 56 directed through eyes 57 and 58 provided for them in the plates 50. A similar eye 59 is provided on each plate 50 for receiving a strap or other means for attaching the anti-skid device to a tire.

If desired only two plates 50 connected by a cross link 53 may be used in each anti-skid device. In this case the eyes 58 of plates 50 will be eliminated.

Preferably, the plate members and links will be curved to correspond with the curved surface of a tire.

It is to be noted that the anti-skidding device of this invention is relatively simple in its construction. It consists of metallic plates connected together by links, all parts of which may be readily formed mechanically. Moreover, it is to be noted that the device will be very efficient in its operation in that it provides lugs arranged in positions relative to each other so that it is practically impossible for the vehicle to skid in any direction. In addition to this, it is to be noted that the anti-skidding device of this invention can be readily applied to a vehicle wheel.

While at the present time, it is felt that it is preferable to use three sets of the anti-skid devices to each wheel arranged 120° apart circumferentially of the wheel, it is to be understood that the devices may be placed at relatively short intervals completely about the entire circumference of the wheel; thus for example, the sets of chains 11a, 11b of the first form may be connected to similarly arranged sets positioned relatively close to each other and secured together by means of continuous chains which will be arranged circumferentially at the sides of the wheel.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. An anti-skid device comprising a tread plate provided with a pair of relatively long and narrow substantially rectangular lugs at the opposite end edges of said plate substantially midway between the sides of said plate, each lug being reenforced by a substantially pyramidal-shaped mass formed integrally with said plate and said lug, the length of said mass at its base substantially equalling the length of said lug and the height of said mass substantially equalling the height of said lug, and a pair of similarly-shaped lugs substantially midway between the ends of said plate and at right angles to the lugs at the ends, the bases of said masses covering a material area of said tread plate and the outer edges of those at the center being relatively close to each other to materially reenforce both the central lugs and the center of said plate.

2. An anti-skid device comprising a plurality of tread plates adapted to extend cross-wise of an automobile tire, each plate provided with a plurality of pairs of upright anti-skid lugs arranged at the sides of said plates opposite each other, a pair of similar lugs at the ends of said plates and still another pair of similar lugs in the center of said plate facing each other, links connecting said plates together to form a chain, each link having a pair of upright anti-skid lugs at its ends and a single lug in the center, a similarly arranged chain substantially parallel with said first chain and links connecting corresponding plates of said chains so as to join said chains together, said last named links being similar to said first links, but arranged substantially at right angles thereto.

3. An anti-skid device comprising a tread plate having one surface arranged to be applied to the surface of a tire and an upper substantially flat horizontal surface functioning as a tread area, said upper surface being provided with two pairs of upright relatively narrow elongated lugs positioned opposite each other at the corners, a pair of similar lugs positioned opposite each other at the ends and another pair of similar lugs positioned opposite each other in the center, each of said lugs being reenforced by a substantially pyramidal shaped mass formed integrally with said plate and with said lug, the bases of said masses covering a material portion of the area of said upper surface and the outer edges of the bases for said lugs at the center being relatively close to each other to materially increase the mechanical strength of said plate at the center, and the reenforcing masses providing three upwardly inclined relatively large surfaces for each of said lugs, said surfaces defining cutting edges at their intersections.

4. An anti-skid device comprising a tread plate adapted to be applied to the surface of a tire, the surface of said tread plate being provided with a plurality of pairs of lugs spaced at intervals along the sides of said plate, the lugs of each pair being positioned opposite each other, similar lugs at the ends of said plate opposite each other and arranged at right angles to the lugs at the sides of said plate, a pair of lugs in the center of said plate facing each other and arranged in parallelism with the lugs at the side, and an additional pair of lugs arranged between those at the center and those at the ends and arranged in parallel relation with those at the ends.

5. An anti-skid device comprising a tread plate provided with a pair of relatively long and narrow substantially rectangular lugs at the opposite end edges of said plate substantially midway between the sides of said plate, each lug being reenforced by a substantially pyramidal-shaped mass formed integrally with said plate and said lug, the length of said mass at its base substantially equalling the length of said lug and the apex of said mass being spaced slightly below the top surface of said lug so that a free relatively narrow rectangular cutting section is provided at the top of said reenforced lug, and a pair of similarly-shaped lugs at the side edges of said plate substantially midway between its ends and at right angles to the lugs at the ends, the bases of said masses covering a material area of said tread plate and the outer edges of those at the center being relatively close to each other to materially reenforce both the central lugs and the center of said plate.

6. An anti-skid device comprising a tread plate provided with a pair of relatively long and narrow substantially rectangular lugs at the opposite end edges of said plate substantially midway between the sides of said plate, each lug being reenforced by a substantially pyramidal-shaped mass formed integrally with said plate and said lug, the length of said mass at the base substantially equalling the length of said lug and the apex of said mass being spaced slightly below the top surface of said lug so that a free relatively narrow rectangular cutting section is provided at the top of said reenforced lug, a pair of similarly-shaped lugs at the side edges of said plate substantially midway between its ends and at right angles to the lugs at the ends, the bases of said masses covering a material area of said tread plate and the outer edges of those at the center being relatively close to each other to materially reenforce both the central lugs and the center of said plate, each of said plates having connecting eyes, a plurality of links each having lugs and reenforcing masses similarly shaped and located as on said plates, and loops secured to said links and directed through said eyes on said plates so as to mechanically connect said plates together, into a chain.

JOSEPH CENTOFANTI.